US011178082B2

(12) United States Patent
Ghotbi et al.

(10) Patent No.: US 11,178,082 B2
(45) Date of Patent: Nov. 16, 2021

(54) SMART COMMUNICATIONS ASSISTANT WITH AUDIO INTERFACE

(71) Applicant: Microsoft Technology Licensing, LLC, Redmond, WA (US)

(72) Inventors: Nikrouz Ghotbi, Redmond, WA (US); August Niehaus, Bellevue, WA (US); Sachin Venugopalan, Bellevue, WA (US); Aleksandar Antonijevic, Bellevue, WA (US); Tvrtko Tadic, Seattle, WA (US); Vashutosh Agrawal, Bellevue, WA (US); Lisa Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/684,748

(22) Filed: Nov. 15, 2019

(65) Prior Publication Data

US 2020/0084166 A1    Mar. 12, 2020

Related U.S. Application Data

(63) Continuation of application No. 15/786,184, filed on Oct. 17, 2017, now Pat. No. 10,516,637.

(51) Int. Cl.
*H04L 12/58* (2006.01)
*G06F 3/16* (2006.01)
(Continued)

(52) U.S. Cl.
CPC ............ *H04L 51/063* (2013.01); *G06F 3/167* (2013.01); *G06F 16/345* (2019.01); *G06F 40/30* (2020.01);
(Continued)

(58) Field of Classification Search
CPC ...... H04L 51/063; H04L 51/046; H04L 51/26; G06F 16/345; G06F 40/30; G06F 3/167; G06N 5/02; G10L 15/22
See application file for complete search history.

(56) References Cited

U.S. PATENT DOCUMENTS 9,223,859 B2 * 12/2015 Manera ................. G06F 16/345
10,685,049 B2 * 6/2020 Bax ........................ H04L 51/16
(Continued)

FOREIGN PATENT DOCUMENTS

WO      2017200595 A1    11/2017

OTHER PUBLICATIONS

"International Search Report and Written Opinion Issued in PCT Application No. PCT/US2018/055119", dated Dec. 7, 2018, 14 pages.

*Primary Examiner* — Kristie D Shingles
(74) *Attorney, Agent, or Firm* — Alleman Hall Creasman & Tuttle LLP

(57) ABSTRACT

Methods, systems, and computer programs are presented for a smart communications assistant with an audio interface. One method includes an operation for getting messages addressed to a user. The messages are from one or more message sources and each message comprising message data that includes text. The method further includes operations for analyzing the message data to determine a meaning of each message, for generating a score for each message based on the respective message data and the meaning of the message, and for generating a textual summary for the messages based on the message scores and the meaning of the messages. A speech summary is created based on the textual summary and the speech summary is then sent to a speaker associated with the user. The audio interface further allows the user to verbally request actions for the messages.

20 Claims, 9 Drawing Sheets

(51) Int. Cl.
*G06F 16/34* (2019.01)
*G06N 5/02* (2006.01)
*G10L 15/22* (2006.01)
*G06F 40/30* (2020.01)

(52) U.S. Cl.
CPC ................ *G06N 5/02* (2013.01); *G10L 15/22* (2013.01); *H04L 51/046* (2013.01); *H04L 51/26* (2013.01)

(56) References Cited

U.S. PATENT DOCUMENTS

| | | | |
|---|---|---|---|
| 2006/0184366 A1* | 8/2006 | Hidaka | G10L 25/00 704/240 |
| 2012/0290289 A1* | 11/2012 | Manera | G06F 16/345 704/9 |
| 2013/0275138 A1 | 10/2013 | Gruber et al. | |
| 2014/0195252 A1* | 7/2014 | Gruber | G10L 15/22 704/275 |
| 2017/0171121 A1* | 6/2017 | Zhang | H04L 51/066 |

* cited by examiner

SMART COMMUNICATIONS ASSISTANT WITH AUDIO INTERFACE

CROSS REFERENCE TO RELATED APPLICATIONS

This application claims the benefit of priority to U.S. application Ser. No. 15/786,184, filed Oct. 17, 2017, the content of which is hereby incorporated by reference in their entirety.

TECHNICAL FIELD

The subject matter disclosed herein generally relates to methods, systems, and programs for improving user interaction with electronic devices.

BACKGROUND

Ambient devices are becoming more common in people's lives, such as hands-free devices on cars, smart headphones, digital assistants without displays, Bluetooth headsets, etc. As a result, speech-based interfaces are becoming more common. Verbal interactions are easy for asking simple questions (e.g., what time is it, what's the temperature, who wrote Don Juan, remind me at 5 to turn on the oven) but difficult two absorb long messages, such as emails.

There are many situations where users do not have easy access to an electronic device with a display and the user wants to check the status of communications, e.g., new emails, new text messages, new social network posts, etc. Often, communications include a textual component, and is very easy to consume this type of communications when a display is available, but much more difficult to access this content via audio communications. It is much harder to process messages "read" to someone than simply reading the messages, because it takes the brain much more focus to listen to messages than to read them.

For example, if a user is jogging, it is not easy to read a display, however, the user is able to listen for messages. Unfortunately, some messages (e.g., email messages) may be long and simply having an electronic device read these long messages may take a long time and a large amount of concentration. Further, trying to read a display while jogging may have disastrous consequences, such as having an accident or dropping and damaging the phone.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
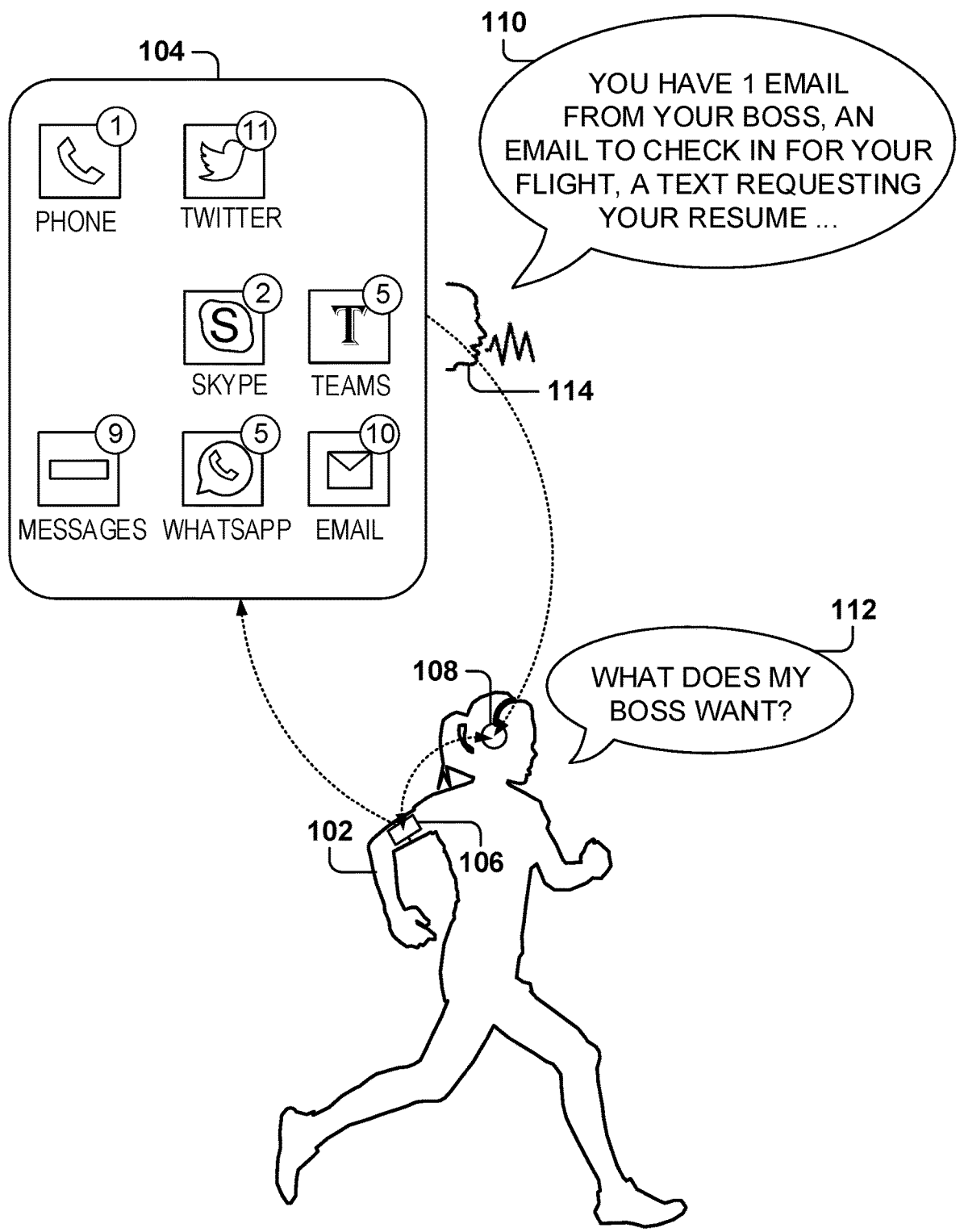
FIG. 1 illustrates the use of a smart communications assistant with an audio interface, according to some example embodiments.

Example methods, systems, and computer programs are directed to a smart communications assistant with an audio interface. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As more ambient devices, such as smart speakers, connected cars with hands-free computers, and connected headphone devices, users wish to monitor text-based communications, such as emails, text messages, social network messages, etc., via speech interfaces. However, consuming textual communications may become difficult with speech interfaces because the communications may be long or there may be too many messages that need to be prioritized for presentation. Further, it is much easier to consume textual communications with a display than by converting text to speech.

Embodiments presented herein provide for a smart communications assistant with an audio interface that is able to interact with the user via verbal commands and verbal responses. The smart communications assistant is able to gather messages from multiple sources, analyze the messages to identify meaning and priorities, and then provide message summaries or detailed information about selected messages.

The systems presented herein provide access to multiple sources of messages followed by analysis and prioritization of communications, which includes creating insights about the content of the messages to better inform the user verbally. For example, the smart communications assistant is able to report a summary of new messages, identify messages from important persons, identify action items requested in the body of the message, identify request from an airline to check-in, etc.

A speech-based interface allows the user to communicate using natural language to request operations about textual messages, such as providing summaries, reading a message, getting a summary of the message, dictating and sending a message, etc.

In one embodiment, a method is provided. The method includes an operation for getting messages from one or more message sources. The messages are addressed to a user and each message includes message data comprising text. The method further includes operations for analyzing the message data to determine a meaning of each message, for generating a score for each message based on the respective message data and the meaning of the message, and for generating a textual summary for the messages based on the message scores and the meaning of the messages. A speech summary is created based on the textual summary and the speech summary is then sent to a speaker associated with the user. The audio interface further allows the user to verbally request actions for the messages.

In another embodiment, a system includes a memory comprising instructions and one or more computer processors. The instructions, when executed by the one or more computer processors, cause the one or more computer processors to perform operations comprising: getting one or more messages from one or more message sources, the one or more messages being addressed to a user, each message comprising message data that includes text; analyzing the message data to determine a meaning of each message; generating a score for each message based on the respective message data and the meaning of the message; generating a textual summary for the one or more messages based on the message scores and the meaning of the messages; creating a speech summary based on the textual summary; and sending the speech summary to a speaker associated with the user.

In yet another embodiment, a non-transitory machine-readable storage medium including instructions that, when executed by a machine, cause the machine to perform operations comprising: getting one or more messages from one or more message sources, the one or more messages being addressed to a user, each message comprising message data that includes text; analyzing the message data to determine a meaning of each message; generating a score for each message based on the respective message data and the meaning of the message; generating a textual summary for the one or more messages based on the message scores and the meaning of the messages; creating a speech summary based on the textual summary; and sending the speech summary to a speaker associated with the user.

FIG. 1 illustrates the use of a smart communications assistant with an audio interface, according to some example embodiments. A user 102 is jogging listening to a headphone 108, which is wirelessly connected to a phone 106. The phone 106 provides a user interface 104 that shows a plurality of different messages applications, such as email, Skype®, phone, Twitter®, a team-collaboration application, messaging, and WhatsApp®. Other types of messaging apps may also be included for the smart communications assistant 114, such as social network messages.

The applications provide textual communications, but other types of communications may also be utilized, such as voice communications (e.g., voicemail). For example, the smart communications assistant 114 may listen to a voicemail and convert the voicemail to text. In some example embodiments, each application includes a numerical indicator showing how many new communications have arrived.

The user 102 has requested a summary of new incoming communications, and the smart communications assistant 114 analyzes the different type of messages to generate a verbal summary 110 for the user, such as, "You have one email from your boss, and email to check-in for your flight, a text requesting your resume, a voicemail from your father, and 27 other messages."

In the example of FIG. 1, the user then requests verbally 112, "What does my boss want?" and the smart communications assistant 114 responds with a summary of the email from the user's boss. If the user asked, "read me the message from my boss," then the smart communications assistant 114 would read the message instead of providing a summary. The interactions may continue between the smart communications assistant 114 and the user 102.

It is noted that the embodiments presented herein are described with reference to text communications, but the same principles may be applied to other forms of communication. In some example embodiment, the smart communications assistant 114 may convert other types of communications to text and then process them with other text-based communications. For example, the smart communications assistant 114 may convert a voicemail, a fax, an email attachment, a scan, etc., to text for processing.

In prior solutions, some digital assistants are able to just read a message by converting text to speech. However, these solutions are unable to understand the content of messages, prioritize the messages, and generate summaries for the user. Therefore, these prior solutions are not very useful. For example, if the prior-art assistant reads all the new messages to the user 102, let's say 7 new emails, it may take a longtime to read all the messages, and the important messages are embedded within messages that may be unimportant and long.

The smart communications assistant 114 may be useful in many other types of scenarios. For example, a user may be getting ready to get in the car and drive to work, and the user may ask the smart communications assistant 114 to get a summary of communications before he leaves. If the smart communications assistant 114 tells the user that there is an urgent communication from her boss asking for an update on a certain project, the user may instead access an email application to reply before driving to work. Further, a speech interface may be very useful when the user is driving and does not have access to a display.

The goal of the smart communications assistant 114 is to provide an easy-to-use speech interface for accessing communications data. Studies have shown that a user may require significantly more cognitive load to understand content communicated through speech only than content communicated via a Graphical User Interface (GUI). For example, understanding and email requires finding out who the sender is, other people copied in the communication, the time when the message was sent, the subject of the message, whether the message has been flagged as high importance, and the text of the message itself. These actions may be performed very quickly when the message is written on display, but it takes much longer time and effort to assimilate the message when all this information has to be read to the user. In fact, while reading, the user is able to skip some parts and focus on the parts of interest (e.g., skip the sent date and time), but this may not be possible when the message is converted to speech.

Providing this type of intelligent assistant is a complex task because it requires understanding the verbal commands from the user, understanding the content of messages, and the ability to determine the importance of these messages to the user.

It is noted that the smart communications assistant 114 may be invoked by the user (e.g., the user asks questions and the smart communications assistant 114 responds to those questions) and the smart communications assistant 114 may also generate communications without prompting in some cases, such as when an email is received showing urgency and requiring prompt action from the user.

Figure 2:
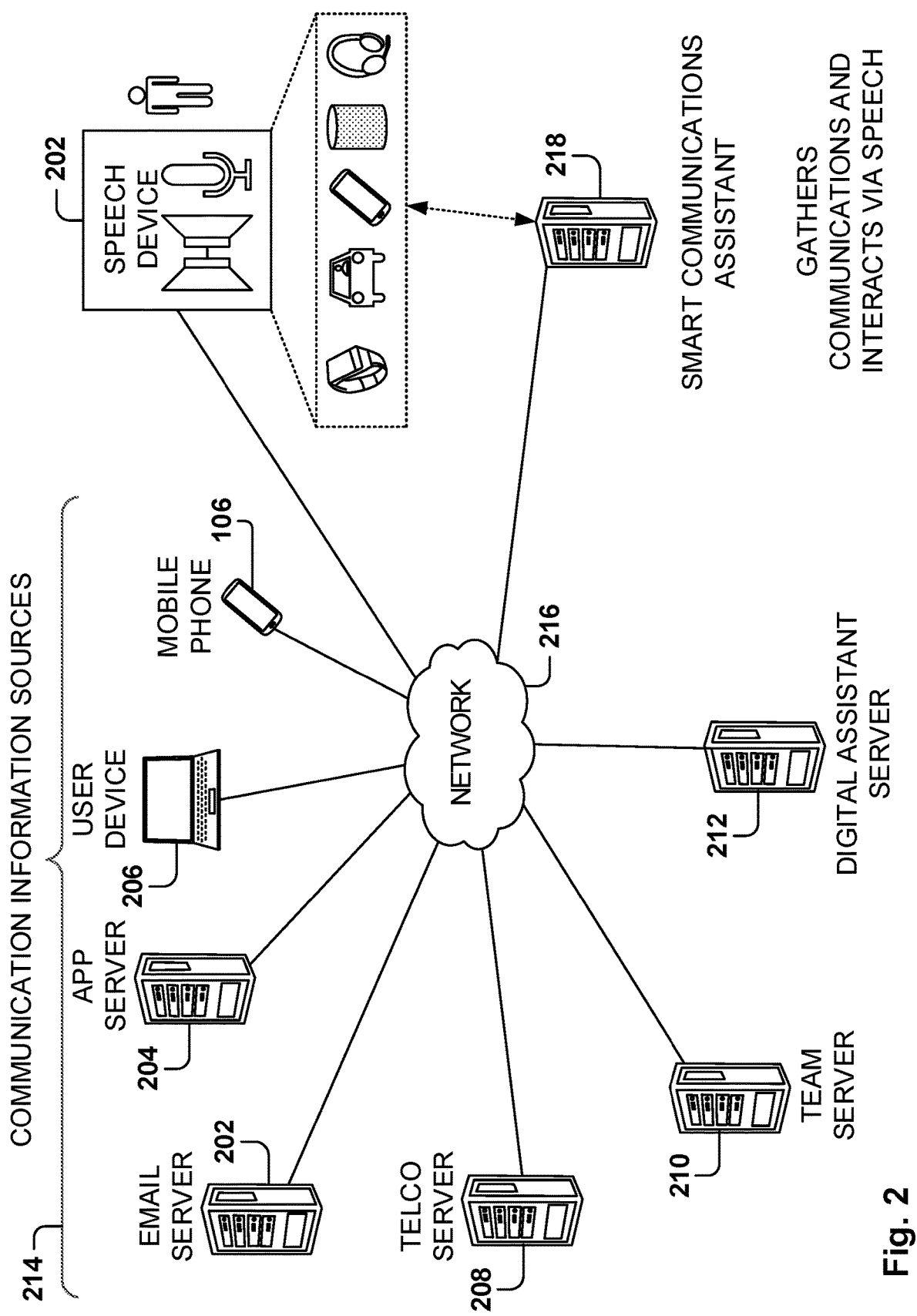
FIG. 2 is an architecture of a system for implementing the smart communications assistant, according to some example embodiments.

FIG. 2 is an architecture of the system for implementing the smart communications assistant, according to some example embodiments. The smart communications assistant server 218 gathers communication information from a plurality of communication sources 214, which include, at least, an email server 202, and application server 204, a user device 206, and mobile phone 106, a telecom server 208, a team-collaboration server 210, a digital assistant server 212, and so forth.

The telecom server 208 may be accessed to gather voicemails or incoming text messages, the email server 202 may be accessed to check for new emails, the application server 204 may be accessed to get application messages (e.g., WhatsApp), a mobile phone 106 may be accessed to get communications data downloaded to the mobile phone 106, the team-collaboration server 210 may be accessed to get communications for a collaboration tool (e.g., Microsoft Teams), the digital assistant server 212 may be accessed to get digital-assistant data (e.g., Cortana, Alexa, Google Home), etc.

In some example embodiments, the smart communications assistant interfaces with the user via a speech device that includes, at least, one or more speakers and one or more microphones. In some cases, the speech device 202 may not include a microphone and inputs to the interface may be performed via touch or other peripheral. Examples of the speech device 202 include a smart phone, a hands-free interface in a car, the mobile phone 106, an ambient device, a headset, a headphone, etc.

The smart communications assistant gathers messaging data from these different sources, and then analyzes the message data to condense the information and make it available via the speech interface. In some example embodiments, the smart communications assistant may also include other types of interfaces. For example, the smart communications assistant may present summaries to the user on a display for quick access to a summary of incoming communications when the user has access to the display.

The smart communications assistant gathers the important information that needs to be communicated to the user so the user is not overwhelmed by a large volume of incoming messages. The important messages are singled out for priority presentation and the smart communications assistant is able to provide an overview so the user can decide whether to get more detailed information, generate a response, or take some other action.

In some example embodiments, the smart communications assistant 114 includes the following features:
  Prioritization and summarization of communications tailored for voice output by devices such as smart speakers.
  Support of quick actions on high-priority messages via speech commands (e.g., making a call, approving an expense report, replying to a message, flagging a message as important, adding a task).
  Prioritizing communications based on rich insights, such as user's relationship to the sender, whether there is a task within the message or an actionable links (e.g., a flight check-in).
  Summarizing high-priority communications for voice output, based on message content and other communication metadata (e.g., sender and subject).
  Delegating communications from audio-only devices to devices with screens (e.g., the summary is very long, the user requests the full-text of the communication, a screen is required to review and approve an expense report).
  Aggregation of communications across one or more sources for prioritization and summarization.
  Providing summaries that cover multiple ways of communication.
  Interaction with other applications (e.g., process a verbal request to add an appointment to the user's calendar).

Figure 3:
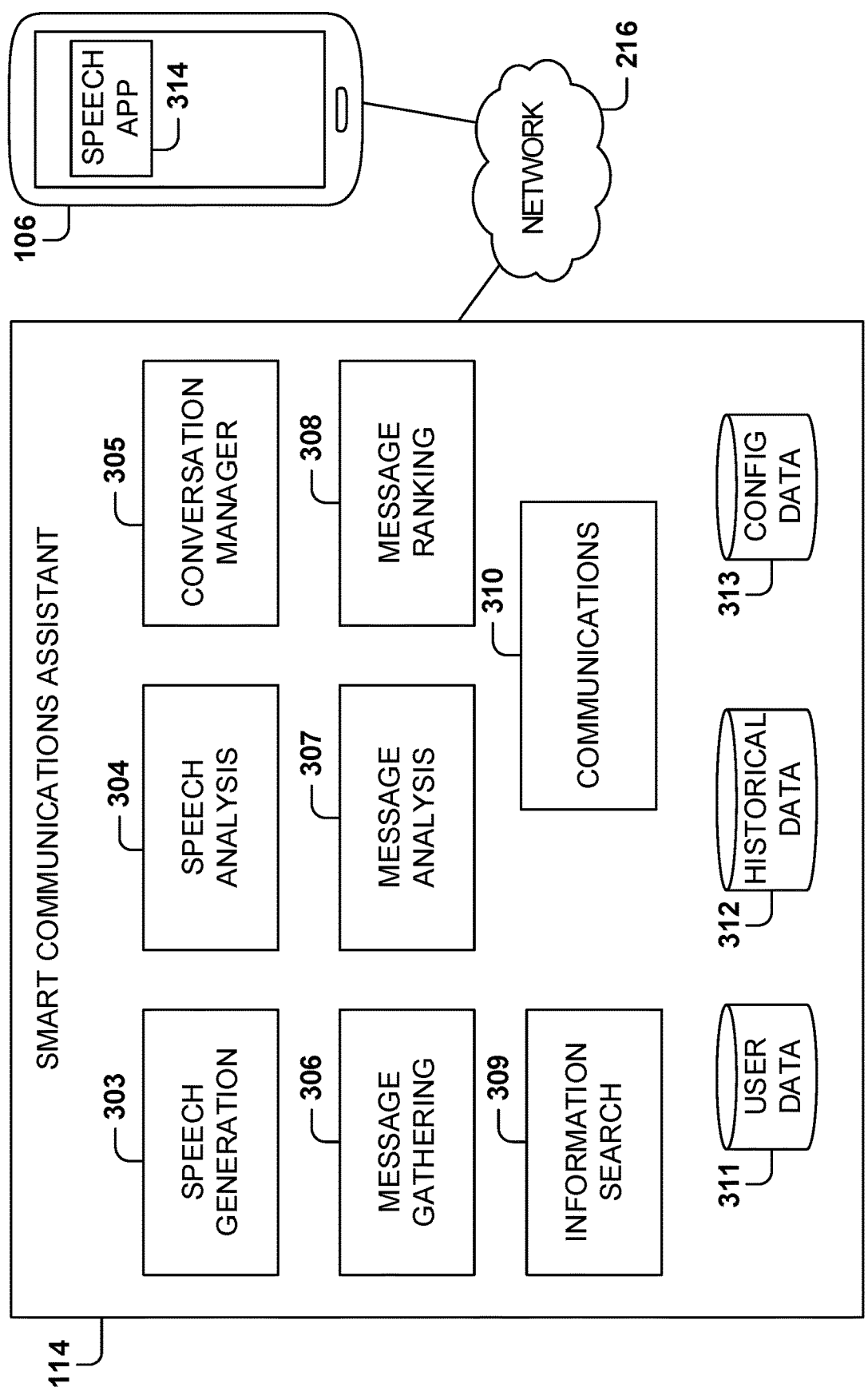
FIG. 3 illustrates the modules of the smart communications assistant, according to some example embodiments.

FIG. 3 illustrates the modules of the smart communications assistant, according to some example embodiments. In some example embodiments, the smart communications assistant 114 includes several modules which may be implemented in hardware, software (e.g., programs), or a combination thereof. The modules include a speech generation module 303, a speech analysis module 304, a conversation manager 305, a message gathering module 306, a message analysis module 307, a message ranking module 308, an information search module 309, a communications module 310, and one or more databases. The databases may include a user data database for storing user-related data (e.g., user profile data, organization chart, friends, teammates, address, etc.), a historical data database 312 that includes information about past user activities (e.g., previous messages and previous responses to messages), and configuration data 313 which includes configuration parameters for the use of the smart communications assistant 114. The configuration parameters may be entered by the system administrator or by the user, or may be adjusted over time by the smart communications assistant 114 based on user preferences.

The speech generation module 303 converts text to speech for presentation to the user. The speech analysis module 304 receives audio (e.g., user speech) and converts the audio to text, e.g., performs voice recognition. The conversation manager 304 provides an interactive interface for the user based on plane-language communications. The conversation manager 304 is able to analyze user language to convert the language into commands for the smart communications assistant 114.

Further, the message gathering module 306 accesses the different sources of message information to gather incoming communications for the user. For example, the message gathering module 306 may access one or more of the communication information sources 214 illustrated in FIG. 2.

The message analysis module 307 analyzes the content of messages to determine the embedded meaning of the messages in order to be able to summarize and provide insights on the content of messages. The message ranking module 308 analyzes message features to determine a score for the messages in order to rank and prioritize the messages for creating summaries or presentation to the user. More details for the message ranking process are provided below with reference to FIGS. 4 and 6-7.

The information search module 309 performs searches for the user, and the searches may be for a generic search, that may be performed by a generic search engine, or searches for user-related information (e.g., search the user calendar, search user incoming messages, search user old messages).

The communications module 310 provides communications capabilities to the smart communications assistant 114 for connecting, to the user or to sources of information, via network 216.

In some example embodiments, an application may be installed on a user device, such as speech app in mobile phone 106, to interact with the smart communications assistant 114 and with the user. In some example embodiments, the speech app 314 may be integrated with the operating system of the device. Another example embodiments, the smart communications assistant 114 may be accessed via a browser or some other app installed on the device. In some example embodiments, some of the functions described above for the smart communications assistant 114 are performed, all or in part, by the speech app 314.

It is noted that the embodiments illustrated in FIG. 3 are examples and do not describe every possible embodiment. Other embodiments may utilize different modules, additional modules, combine the functionality of modules into a single module, fewer modules, distribute the functionality across multiple servers, etc. The embodiments illustrated in FIG. 3 should therefore not be interpreted to be exclusive or limiting, but rather illustrative.

Figure 4:
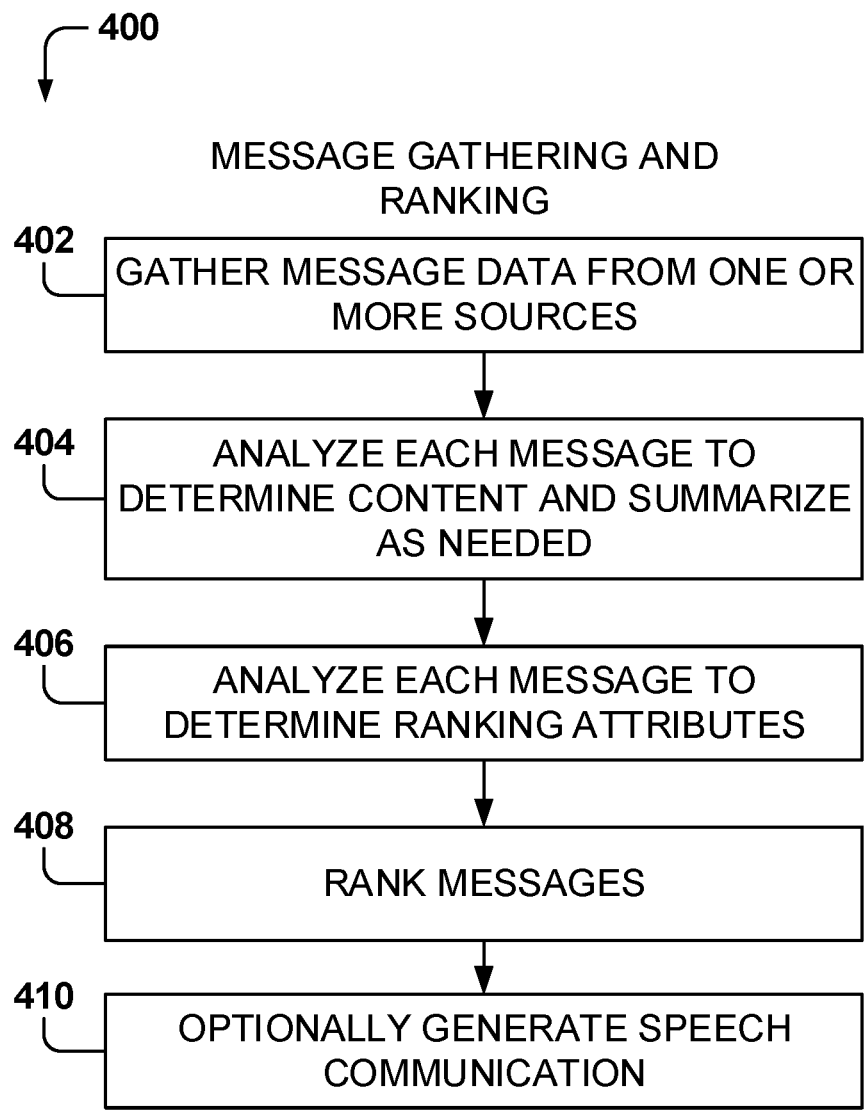
FIG. 4 is a flowchart of a method for message gathering and ranking, according to some example embodiments.

FIG. 4 is a flowchart of a method for message gathering and ranking, according to some example embodiments. While the various operations in this flowchart are presented and described sequentially, one of ordinary skill will appreciate that some or all of the operations may be executed in a different order, be combined or omitted, or be executed in parallel.

At operation 402, the message data is gathered from one or more sources, such as the data sources illustrated in FIG. 2. In some embodiments, the message data includes text, and in other embodiments the message data may be converted to text, such as by performing speech recognition of a voicemail.

From operation 402, the method flows to operation 404, where each message is analyzed to determine their content. In addition, the message content may be summarized as needed (e.g., upon request by the user or when an important message is received and an alarm voice message is generated).

For example, the smart communications assistant may discover that, in the last hour, the user has ten new emails, five new messages in the Instant Message application (e.g., Skype), and one message received via a team collaboration application. The user may ask, "What new communications do I have?" The challenge is to understand the incoming messages, prioritize them, and generate a summary report for the user.

From operation 404, the method flows to operation 406 where each message is analyzed to determine ranking attributes for each message. A operation 408, the messages are ranked based on their ranking attribute values. More details regarding the ranking process are provided below with reference to FIG. 6.

For example, the ranking process may include looking at the identity of the sender, and based on the identity of the sender, the smart communications assistant 114 may decide to mark the message as high-priority. For example, messages received from the boss or the spouse of a user may be ranked as being important. Additionally, it might be detected that the sender is a member of the user's team, and based on this coworker relationship, the message may be marked important, although maybe not as important as the messages from the boss.

At operation 410, a speech communication is created for the user to inform the user of the incoming messages. For example, the smart communications assistant 114 may respond with, "You have two emails from your manager, one instant message from your son, and a text message from an important client," or, "your manager is asking you to send the cells report immediately and you have an email from a client marked as high importance."

The messages that are not considered important (e.g., having a score below a predetermined threshold) may be ignored or presented in summary form, e.g., "You have eight emails, three instant messages, and one text message of low priority." At this point, the user may enter a voice command, such as, "Read the email from my boss," or "Text Jack and tell him I'll be at the restaurant in 15 minutes." In some example embodiments, the message score is a numerical value within a range, such as 0 to 1 or 0 to 100. The threshold for determining priority may be set at a score of 75 out of a 100 and messages with a score below 75 may not be considered important. In other example embodiments, different thresholds for priority may be defined.

Figure 5:
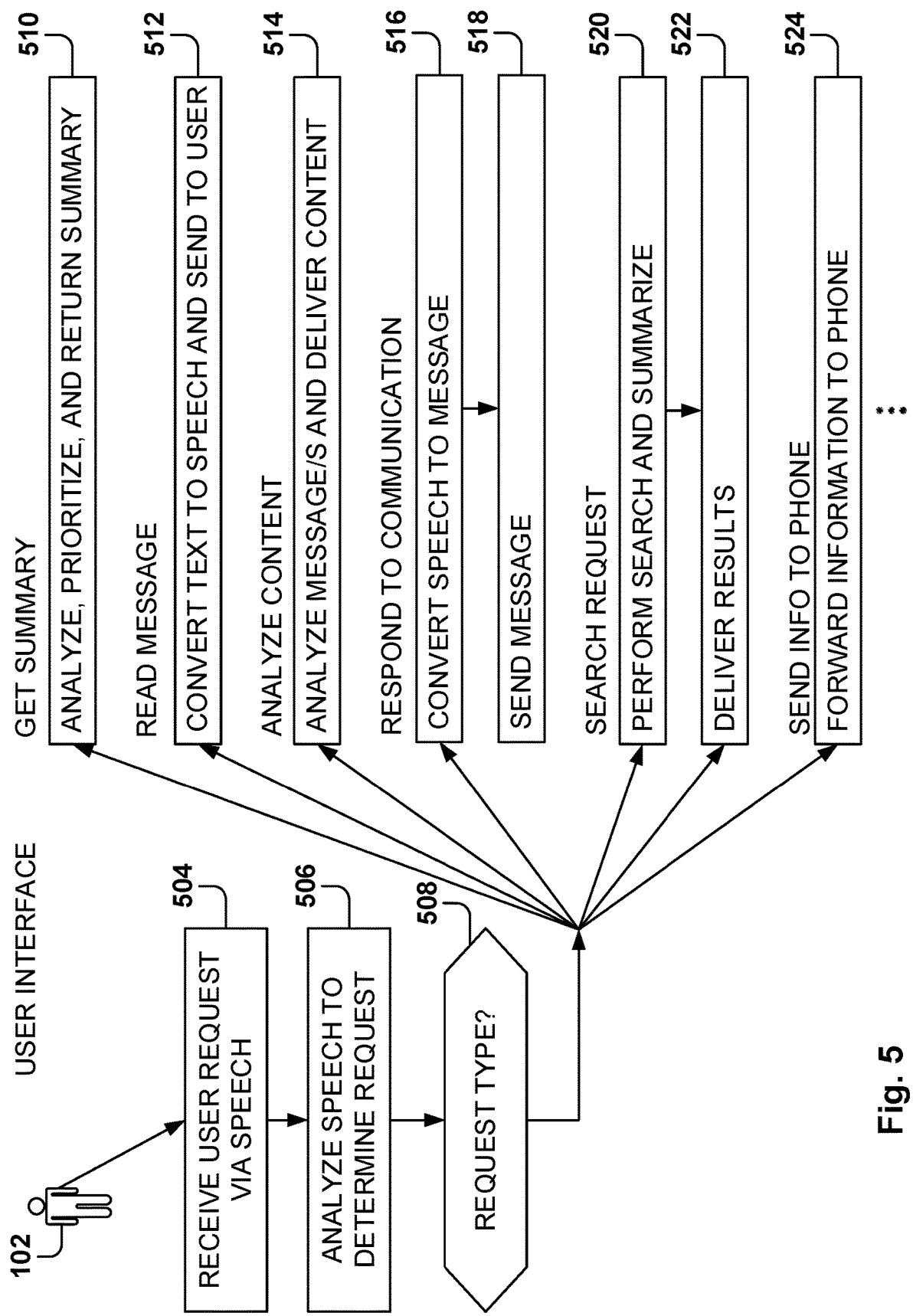
FIG. 5 is if flowchart of a method for implementing the audio interface, according to some example embodiments.

FIG. 5 is if flowchart of a method for implementing the audio interface, according to some example embodiments. While the various operations in this flowchart are presented and described sequentially, one of ordinary skill will appreciate that some or all of the operations may be executed in a different order, be combined or omitted, or be executed in parallel.

At operation 504, a user request is received, via speech, from the user 102. From operation 504, the method flows to operation 506 where the speech received is analyzed to determine the nature of the request. The smart communications assistant 114 simplifies command input by using natural language.

A check is made at operation 508 to determine what type of request has been received from the user. Based on the request type, the method flows to the operations associated with the different request types. FIG. 5 illustrates a few request types, but other types of requests related to verbal communications would be readily appreciated by the person skilled in the art.

Operation 510, for responding to a request for a summary, includes analyzing the incoming messages, prioritizing the incoming messages, and returning the voice summary to the user.

Operation 512, for responding to a request to read a message, includes converting the text of the message to speech and then delivering the speech to the user.

Operation 514, for responding to a request to analyze the content of the message, includes analyzing the content of the message and sending a response. For example, the user may ask, "What does my boss want?" and the smart communications assistant 114 may respond, "He wants to set up a meeting tomorrow at 9 AM." In some example embodiments, if the message is short (e.g., 25 words or less), the complete message may be read instead of trying to summarize the short message.

Operation 516, for answering to a request to respond to a communication, includes converting speech input to a message and sending the message 518 via the corresponding media. For example, the user may request, "answer and tell him that yes, I am available, and add the meeting to my calendar."

Operation 520, for responding to a search request, includes performing a search, summarizing the results, and delivering the results 522 via a voice message to the user.

Operation 524, for responding to a request to send information to the phone, includes sending the summary to the phone so the user may act on the summary later. The information may be forwarded to the phone as a voice recording, a text message, an email, a phone notification, etc.

It is noted that the embodiments illustrated in FIG. 5 are examples and do not describe every possible embodiment. Other embodiments may include different requests or combine requests into a single speech input. The embodiments illustrated in FIG. 5 should therefore not be interpreted to be exclusive or limiting, but rather illustrative.

Figure 6:
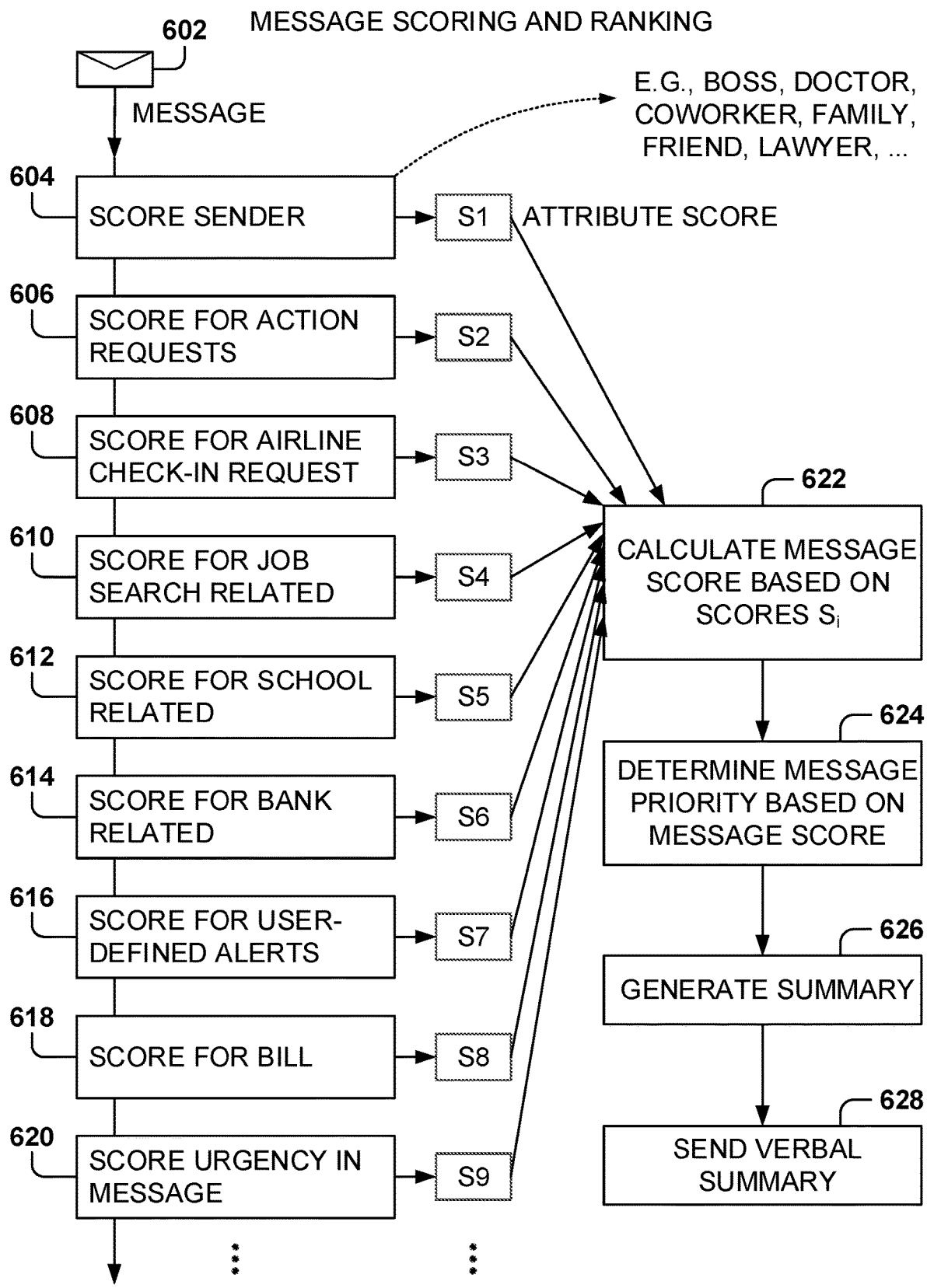
FIG. 6 is if flowchart of a method for message scoring and ranking, according to some example embodiments.

FIG. 6 is if flowchart of a method for message scoring and ranking, according to some example embodiments. While the various operations in this flowchart are presented and described sequentially, one of ordinary skill will appreciate that some or all of the operations may be executed in a different order, be combined or omitted, or be executed in parallel.

Ranking the messages includes examining the messages to identify priorities. The priorities may be based on the senders of the message or other properties, such as a message marked urgent, a message requesting an action from the user, etc. A variety of attributes may be used to rank the messages, such as if this message is marked as having high importance, has the user flagged this type of message before, is there a request for action in the message, has the name of the user being included in a message for another user, etc.

In some cases, not all the new messages are selected for ranking, but only a subset thereof. For example, if the user asks, "Do I have any new messages from my manager? The smart communications assistant 114 may first access the different message sources and extract the messages from the manager, such as messages coming via email, Skype, coming the team-collaboration application, etc. Once all the messages from the manager are collected, then the messages are ranked based on their attributes. Of course, in this case all the messages are from the manager so the difference in ranking will be based on other attributes found in the messages, such as the message having words that signify urgency, the message including a deadline, etc.

In some example embodiments, a plurality of attributes are checked to determine ranking, and each attribute generates an attribute score. Once all the attribute scores are available, then a composite message score is created based on the attribute scores. In other example embodiments, the machine learning program is utilized to determine the message score based on value of the attributes assessed by the machine-learning program and based on past history for prioritizing messages.

There may be a mix of heuristic methods and machine-learning methods to calculate the attribute scores. For example, a heuristic rule may be identified to determine if the sender is the manager of the user, which simply implies checking the identity of the sender of the message. In other cases, a machine learning program may be utilized to determine the score, such as analyzing the communication history between the user and another sender, in order to provide a high score when a particular sender has a pattern of frequent communication with the user and a low score to when the sender communicates infrequently with the user. Thus, the determination of any attribute score may be used using heuristic methods or machine-learning programs. For example, a machine learning program could be used to determine if the sender is the boss of the user, which may be useful when the user may have multiple bosses or in cases where management schemes are not clearly defined, such as when dealing with independent contractors.

FIG. 6 illustrates a plurality of attributes for ranking messages, but other embodiments may utilize additional attributes, fewer attributes, or different combinations of attributes. The embodiments illustrated in FIG. 6 should therefore not be interpreted to be exclusive or limiting, but rather illustrative.

Once a message 602 is received, a score S1 is calculated based on the sender. The score S1 may vary based on the sender. For example, different scores may be assigned to a manager, a spouse, a coworker, a family member, a lawyer, a doctor, a friend, a sports teammate, etc. For example, the score assigned to a message from the boss will be higher than the score assigned to a cousin of the user.

In some example embodiments, the communication patterns of the user with other senders are analyzed (e.g., with a machine-learning program based on previous communications) and the communication pattern may cause the score to be increased or decreased. For example, the user may be engaging in a project with an outside vendor, where the project may last three months. During these three months, the messages from the outside vendor may get high scores if the user is communicating frequently with the outside vendor. However, after the three months, the communications may be much less frequent, if any, and the score for the messages of the outside vendor messages will decrease. Additionally, the communication pattern may also be useful to rank messages from teammates, family members, etc.

The communication patterns may also be useful because, if the system identifies that the user is very quick to respond to certain senders, the system will assume that those senders are important and will be given a high priority.

In some example embodiments, an organizational chart of the company, or part of the company, maybe checked to determine the relationship of the user with the sender. This way, teammates of the sender may be found, or managers that are two levels or higher in the hierarchy. For example, if the boss's boss sends a direct message to the user, without any other recipients, the message will be marked with high priority because it will probably be important to the user. However, if the boss's boss sends a communication to all her subordinates, the message may not be marked as important since may be a routine communication.

A message from a client will also be given a high score, since about 20% of emails coming from clients include a request to act by the user.

At operation 606, a check is made to determine if there are action requests in the body of the message. A machine-learning program is trained with test data that includes sample communications and an indication if those communications included an action item. The machine-learning program utilizes a plurality of features for making predictions, such as words included in the message, identity of the sender, profile of the user, etc. A score S2 will be assigned based on the probability that the message includes one or more action requests, the higher the probability, the higher the S2 score.

At operation 608, a score S3 is determined based on the probability that the message is for a check-in request from an airline. For example, if an airline has sent a message indicating that it is time to check in for a flight the next day, the message will be prioritized.

In some example embodiments, standard schemas are defined for certain communications, such as the communication from the airline. The smart communications assistant 114 checks for the existence of a message that matches a certain schema (e.g., by checking the sender and the subject) and then applies the schema to obtain specific data, such as flight number, departure time, arrival time, departure airport, etc. The use of the schema simplifies the parsing of the message because the schema defines an easy way to obtain the values for the attributes defined in the schema, instead of having to parse a message in free form that would require more time to analyze.

Besides the message from the airline, other common schemas may be utilized, such as schemas for a bank statement, a payment statement, an appointment, a bill, hotel reservations, car reservations, etc.

At operation 610, a determination is made of whether the message is related to a job search, and a score S4 is calculated based on the determination. The score S4 may vary based on the current activities of the user. If the user is unemployed, or actively searching for a new job, the message may be given a high priority, and if the message is for an unsolicited request from a recruiter, the message may be given a lower priority.

At operation 612, a score S5 is determined based on whether the message is school related. If the user is a student, the message will be given a high score, unless behavior patterns show that the user does not respond quickly to school-related messages.

At operation 614, a score S6 is calculated based on the probability that the message is sent by the bank of the user.

In some example embodiments, the user may configure the smart communications assistant 114 with some user-defined alerts. For example, the user may create an alert to give a very high priority to a message from a person that the user just met, or a message from an admissions department from a University, etc. At operation 616, a score S7 is calculated based on the presence of the message associated with the user-defined alert.

At operation 618, a score S8 is calculated based on the probability that the message is a bill sent from a supplier.

At operation 620, a score S9 is calculated based on a determination that the message includes a request for an urgent response. For example, a machine-learning program may analyze the words in the message and determine the sense of energy based on some words that often mean that the message is urgent, such as "hurry up," "do it now," etc. In some example embodiments, the sense of urgency may also be assigned if the message is marked as "High Importance."

Once the attribute scores Si are calculated, at operation 622, the message score is calculated based on the plurality of attribute scores Si. In some example embodiments, the messages are aggregated utilizing a weighted sum of the attribute scores or some other mathematical function. In other example embodiments, a machine-learning program is utilized to calculate the message scores based on the plurality of attribute scores.

From operation 622, the method flows to operation 624 to determine the message priority for each message based on the respective message score. In some example embodiments, the messages are sorted according to their message scores. In some example embodiments, messages are considered important when their score is above a predetermined threshold score.

From operation 624, the method flows to operation 626 where a summary is generated. At operation 628, the summary is converted to speech and then transmitted to a device of the user.

Figure 7:
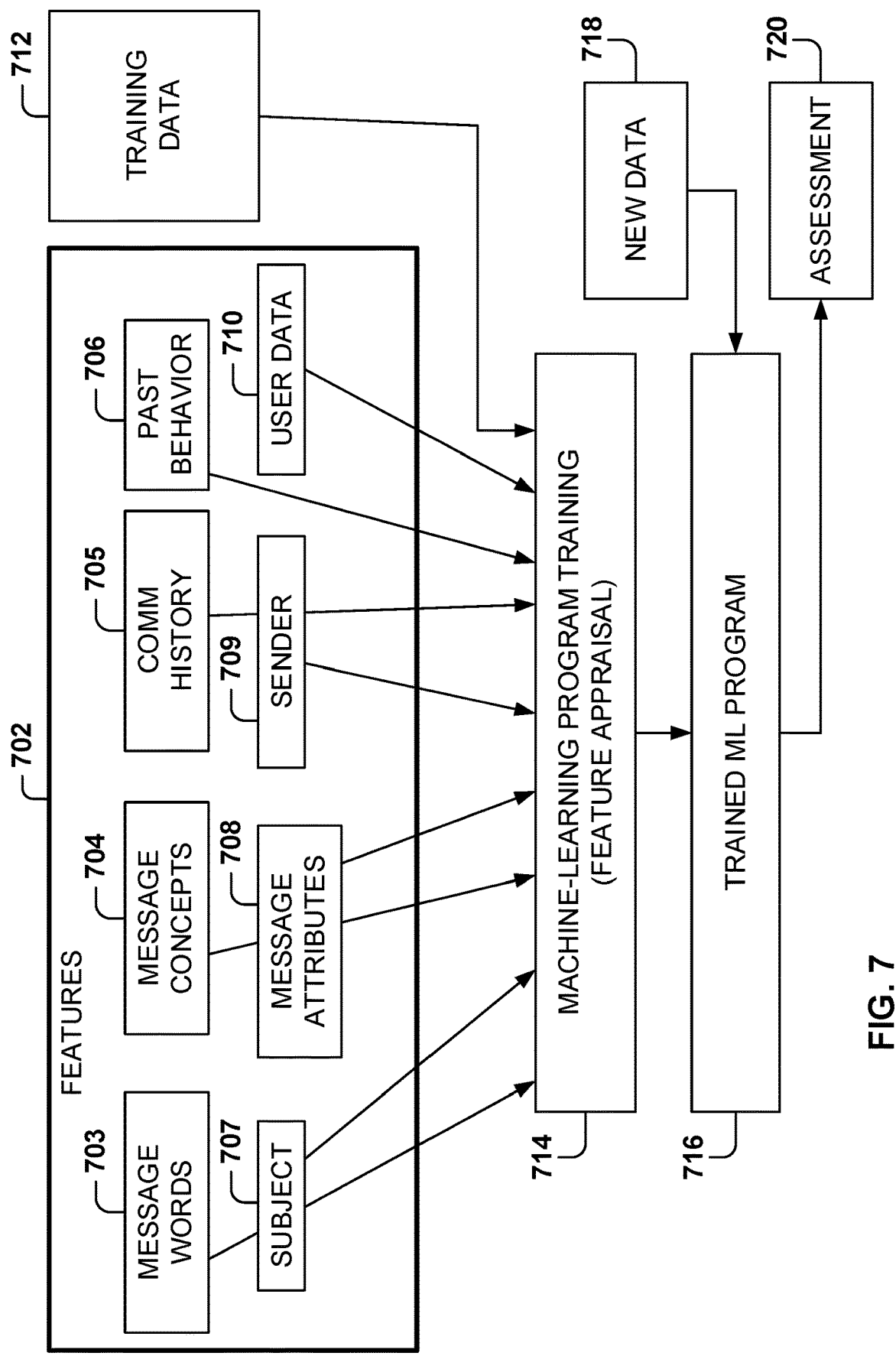
FIG. 7 illustrates the training and use of a machine-learning program, according to some example embodiments.

FIG. 7 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a job affinity score (e.g., a number from 1 to 100) to qualify each job as a match for the user (e.g., calculating the job affinity score). The machine-learning algorithms utilize the training data 712 to find correlations among identified features 702 that affect the outcome.

The machine-learning algorithms utilize features for analyzing the data to generate assessments 720. A feature 702 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 702 may be of different types and may include one or more of words of the message 703, message concepts 704, communication history 705, past user behavior 706, subject of the message 707, other message attributes 708, sender 709, and user data 710.

The machine-learning algorithms utilize the training data 712 to find correlations among the identified features 702 that affect the outcome or assessment 720. In some example embodiments, the training data 712 includes known data for one or more identified features 702 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 712 and the identified features 702, the machine-learning tool is trained at operation 714. The machine-learning tool appraises the value of the features 702 as they correlate to the training data 712. The result of the training is the trained machine-learning program 716.

When the machine-learning program 716 is used to perform an assessment, new data 718 is provided as an input to the trained machine-learning program 716, and the machine-learning program 716 generates the assessment 720 as output. For example, when a message is checked for an action item, the machine-learning program utilizes the message content and message metadata to determine if there is a request for an action in the message.

Figure 8:
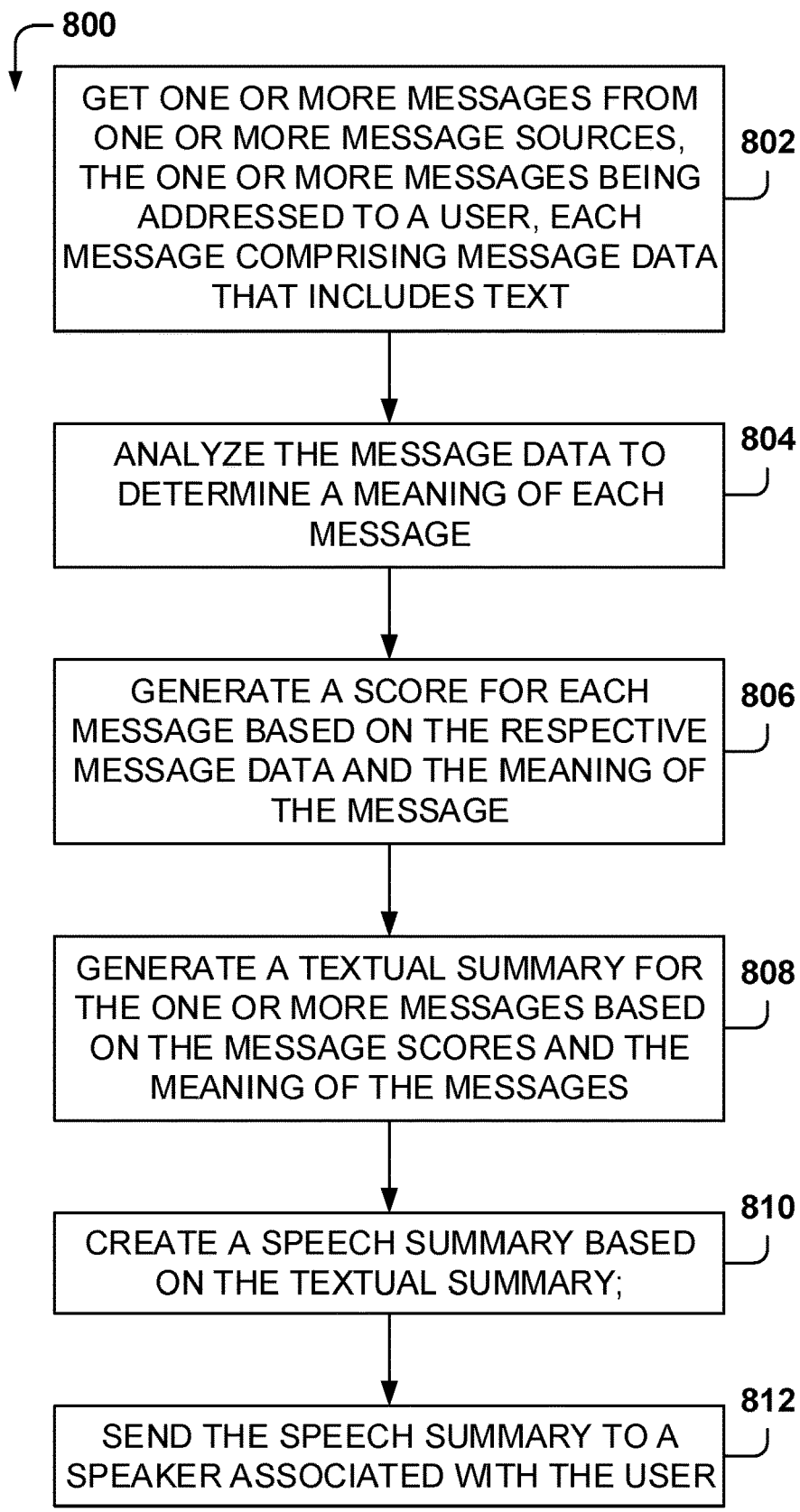
FIG. 8 is flowchart of a method for implementing a smart communications assistant with an audio interface, according to some example embodiments.

FIG. 8 is flowchart of a method for implementing a smart communications assistant with an audio interface, according to some example embodiments. While the various operations in this flowchart are presented and described sequentially, one of ordinary skill will appreciate that some or all of the operations may be executed in a different order, be combined or omitted, or be executed in parallel.

In some example embodiments, the operations of the method are performed by one or more processors. Operation 800 is for getting one or more messages from one or more message sources. The one or more messages are addressed to a user and each message comprises message data that includes text.

From operation 802, the method flows to operation 804 where the message data is analyzed to determine a meaning of each message. From operation 804, the method flows to operation 806, where a score is generated for each message based on the respective message data and the meaning of the message.

From operation 806, the method flows to operation 808 for generating a textual summary for the one or more messages based on the message scores and the meaning of the messages. At operation 810, a speech summary is created based on the textual summary, and, at operation 812, the speech summary is sent to a speaker associated with the user.

In one example, generating the score further includes: for each message, identifying an attribute value for each of a plurality of attributes based on the message data; for each attribute, generating an attribute score based on the attribute values; and generating the score for each message based on the attribute scores of the message.

In one example, a first attribute is whether the message if from a boss of the user. In one example, a second attribute is a work relationship between a sender of the message and the user, the work relationship being based on an organizational chart. In one example, a third attribute is detecting in the text of the message a request for an action to be performed by the user. In one example, a fourth attribute is detecting urgency in the message, the urgency being detected based on words in the text of the message.

In one example, the method 800 further comprises providing a speech interface to the user for receiving commands from the user, the commands comprising one or more of a request for the speech summary, a request to read a message, a request to forward a message, a request to create a reminder, and a request for a summary of a message.

In one example, generating the textual summary further includes determining which messages have a score above a predetermined threshold, and generating the textual summary for the messages having the score above the predetermined threshold.

In one example, getting one or more messages further comprises one or more of getting email messages, getting text messages, getting chat messages, and getting messages from a team-based application.

In one example, generating the textual summary further comprises creating a summary of the meaning of the text of messages selected for the textual summary.

Figure 9:
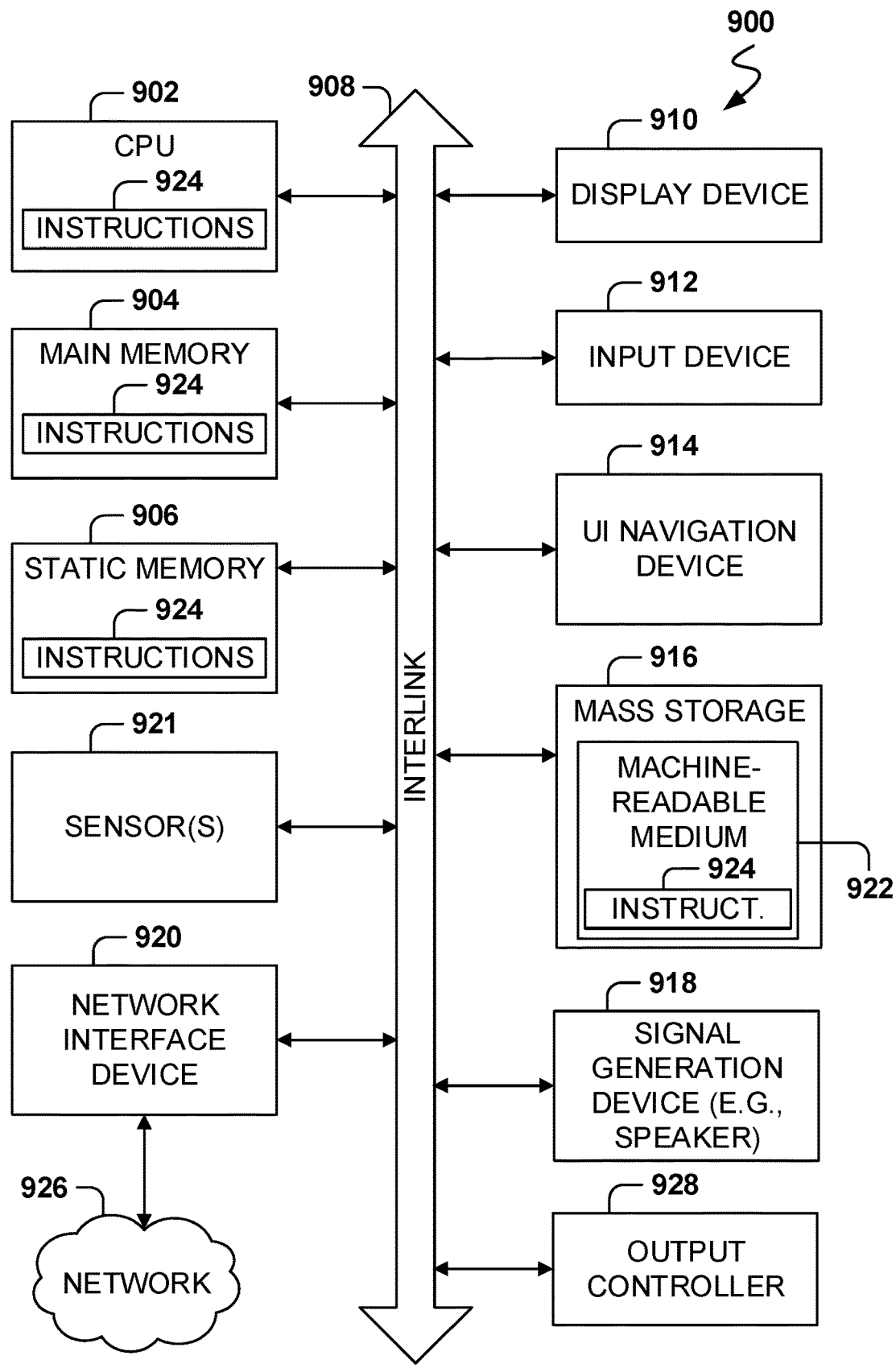
FIG. 9 is a block diagram illustrating an example of a machine upon which one or more example embodiments may be implemented.

FIG. 9 is a block diagram illustrating an example of a machine 900 upon which one or more example embodiments may be implemented. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 900 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a Central Processing Unit (CPU) 902, a main memory 904, and a static memory 906, some or all of which may communicate with each other via an interlink (e.g., bus) 908. The machine 900 may further include a display device 910, one or more input devices 912 (e.g., a keyboard, a microphone, a touchscreen, a game controller, a remote control, a camera, dedicated buttons), and one or more user interface navigation devices 914 (e.g., a mouse, a touchpad, a touchscreen, a joystick, a gaze tracker). In an example, the display device 910, input devices 912, and user interface navigation devices 914 may include a touchscreen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, magnetometer, or other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the CPU 902 during execution thereof by the machine 900. In an example, one or any combination of the CPU 902, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that causes the machine 900 to perform any one or more of the techniques of the present disclosure, or that is capable of storing, encoding or carrying data structures used by or associated with such instructions 924. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method comprising:
   obtaining, by one or more processors, one or more messages from one or more message sources, the one or more messages being addressed to a user, each message comprising message data that includes message text;
   creating a textual summary for each message in a subset of the one or more messages;
   creating a speech summary summarizing all messages in the subset based on the textual summary;
   sending, by the one or more processors, the speech summary for playback via an audio device associated with the user;
   in response to sending the speech summary to the audio device, receiving a command from the user to delegate communications for at least one message of the one or more messages to a device having a screen, different from the audio device; and
   initiating the delegation on behalf of the user.

2. The method as recited in claim 1, wherein the delegation comprises sending the textual summary of the at least one message to the device having the screen.

3. The method as recited in claim 2, wherein the textual summary of the at least one message is sent to the device having the screen as any of a voice recording, a text message, an email, or a phone notification.

4. The method as recited in claim 1, wherein the delegation comprises sending the at least one message of the one or more messages to the device having the screen.

5. The method as recited in claim 1, wherein the audio device omits a screen.

6. The method as recited in claim 1, wherein the textual summary is based on the message data and a meaning of the message text.

7. The method as recited in claim 1, wherein the speech summary summarizes the messages in the subset by at least one of:
   importance of the message;
   a type of communication of the message; and
   meaning of the message text.

8. The method as recited in claim 7, wherein the type of communication comprises an email message, a text message, a chat message, and a message from an application.

9. The method as recited in claim 1, wherein generating the textual summary comprises creating a summary of a meaning of the message text of a corresponding message.

10. The method as recited in claim 1, further comprising:
analyzing the message data of the one or more messages to determine a meaning of the message text in each message;
generating a score for each message based on each message's respective message data and the meaning of the message text in each message;
selecting messages for the subset based on the score of each message.

11. A system comprising:
a memory comprising instructions; and
one or more computer processors, wherein the instructions, when executed by the one or more computer processors, cause the one or more computer processors to perform operations comprising:
obtaining, by one or more processors, one or more messages from one or more message sources, the one or more messages being addressed to a user, each message comprising message data that includes message text;
creating a textual summary for each message in a subset of the one or more messages;
creating a speech summary summarizing all messages in the subset based on the textual summary;
sending, by the one or more processors, the speech summary for playback via an audio device associated with the user;
in response to sending the speech summary to the audio device, receiving a command from the user to delegate communications for at least one message of the one or more messages to a device having a screen different from the audio device; and
initiating the delegation on behalf of the user.

12. The system as recited in claim 11, wherein the delegation comprises sending the textual summary of the at least one message to the device having the screen.

13. The system as recited in claim 11, wherein the delegation comprises sending the at least one message of the one or more messages to the device having the screen.

14. The system as recited in claim 11, wherein the audio device omits a screen.

15. The system as recited in claim 11, further comprising:
analyzing the message data of the one or more messages to determine a meaning of the message text in each message;
generating a score for each message based on each message's respective message data and the meaning of the message text in each message;
selecting messages for the subset based on the score of each message.

16. A machine-readable storage medium including instructions that, when executed by a machine, cause the machine to perform operations comprising:
obtaining, by one or more processors, one or more messages from one or more message sources, the one or more messages being addressed to a user, each message comprising message data that includes message text;
creating a textual summary for each message in a subset of the one or more messages;
creating a speech summary summarizing all messages in the subset based on the textual summary;
sending, by the one or more processors, the speech summary for playback via an audio device associated with the user;
in response to sending the speech summary to the audio device, receiving a command from the user to delegate communications for at least one message of the one or more messages to a device having a screen, different from the audio device; and
initiating the delegation on behalf of the user.

17. The storage medium as recited in claim 16, wherein the delegation comprises sending the textual summary of the at least one message to the device having the screen.

18. The storage medium as recited in claim 16, wherein the delegation comprises sending the at least one message of the one or more messages to the device having the screen.

19. The storage medium as recited in claim 16, wherein the audio device omits a screen.

20. The storage medium as recited in claim 16, further comprising:
analyzing the message data of the one or more messages to determine a meaning of the message text in each message;
generating a score for each message based on each message's respective message data and the meaning of the message text in each message;
selecting messages for the subset based on the score of each message.

* * * * *